United States Patent
Wischemann

[11] Patent Number: 5,707,582
[45] Date of Patent: Jan. 13, 1998

[54] PROCESS FOR VACUUM FORMING A STUD PLATE FROM A PLASTIC SHEET

[76] Inventor: Heinrich Wischemann, Margueritenweg 17, 48607 Ochtrup, Germany

[21] Appl. No.: 499,096

[22] Filed: Jul. 6, 1995

Related U.S. Application Data

[63] Continuation of Ser. No. 92,264, Jul. 15, 1993, abandoned.

[30] Foreign Application Priority Data

| | | | |
|---|---|---|---|
| Jul. 23, 1992 | [DE] | Germany | 42 24 295.9 |
| Sep. 12, 1992 | [DE] | Germany | 42 30 577.2 |
| Nov. 19, 1992 | [DE] | Germany | 42 38 943.7 |

[51] Int. Cl.⁶ .................................................. B29C 67/00
[52] U.S. Cl. ................................................... 264/554
[58] Field of Search ........................... 264/554; 425/388; 249/104

[56] References Cited

U.S. PATENT DOCUMENTS

| | | | |
|---|---|---|---|
| 1,580,485 | 4/1926 | Hahn | 249/104 |
| 3,126,582 | 3/1964 | Scott | 425/388 |
| 3,378,888 | 4/1968 | Robertson | 425/388 X |

FOREIGN PATENT DOCUMENTS

| | | | |
|---|---|---|---|
| 1929878 | 12/1970 | Germany | |
| 2757184 | 6/1979 | Germany | 425/388 |

*Primary Examiner*—Christopher A. Fiorilla

[57] ABSTRACT

A process for producing a stud plate from plastic by vacuum forming uses a positive mold (21) in which these is held on the end face (32) of each stud (28), a flexible elastic disc which protrudes with a part (45) of its flexible length over the edge. A projection (22, 24) of a hollow stud is formed thereon. During demolding a part (44) of the disc lying radially further inwards bends upwards from the end face, so that the protruding part (45) yields and readily slides along the inner wall (49) of the previously molded hollow stud (11).

20 Claims, 3 Drawing Sheets

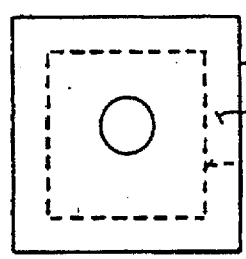
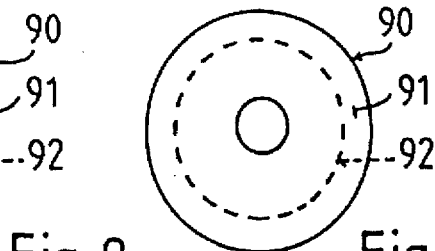
Fig.8a  Fig.8b
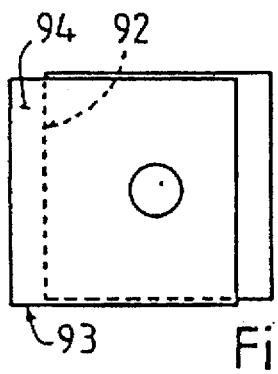
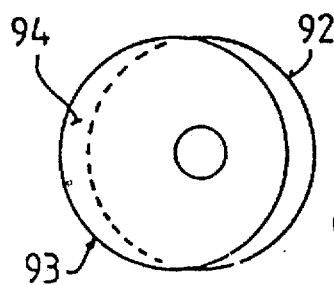
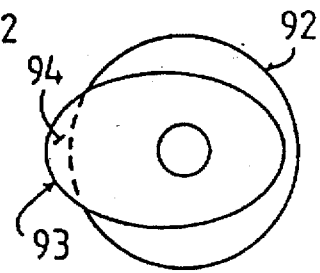
Fig.9a  Fig.9b  Fig.9c
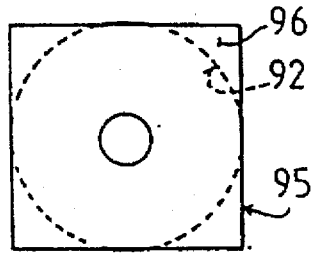
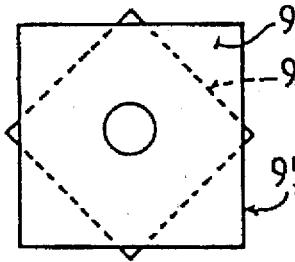
Fig.10a  Fig.10b  Fig.10c
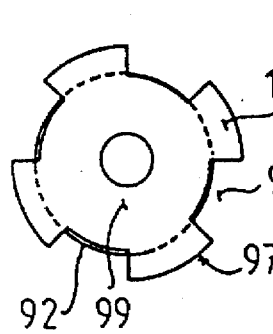
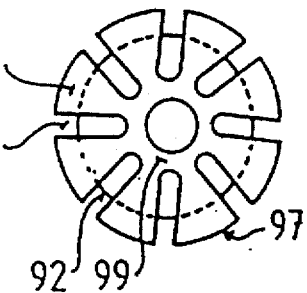
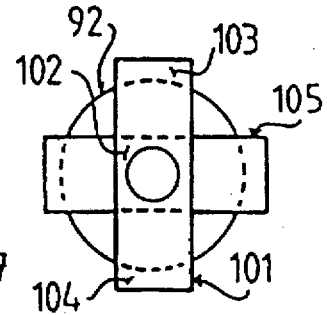
Fig.11a  Fig.11b  Fig.11c
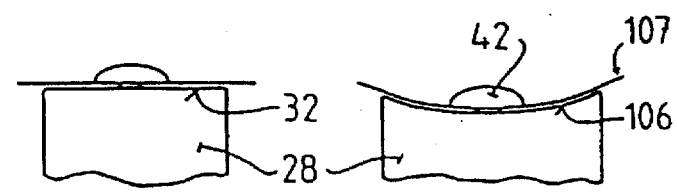
Fig.12a  Fig.12b

PROCESS FOR VACUUM FORMING A STUD PLATE FROM A PLASTIC SHEET

This application is a continuation of application Ser. No. 08/092,264, filed Jul. 15, 1993, now abandoned.

BACKGROUND OF THE INVENTION

1. Field of the Invention

The invention relates to a process for vacuum forming from a plastic sheet a stud plate having hollow studs standing up from a base plate at predetermined positions, each hollow stud being provided with an inner wall and an upper circumferential edge with at least one radially protruding projection.

This process serves primarily for producing stud plates which serve for pre-fixing flexible plastic heating tubes for floor heating systems. A flexible heating tube is embedded in a meandering manner in the screed of a floor. The stud plate permits a uniform course of the flexible tube and especially fixes the flexible tube when the still low-viscosity screed is applied. So the tube does not push upwards, it must be locked from above by projections from the hollow studs of the stud plate.

These projections pose problems regarding production. If the mould studs of the positive mould have rigidly formed mould projections, the hollow studs must expand on removal from the positive mould in order to be able to slide over said mould projections. On the one hand, it is often only possible to produce projections protruding to an insufficient extent, on the other hand it is only possible to process a thin plastic sheet of restricted plastics grades. It is also possible to incorporate into the studs movable mould projections which are drawn back or pivoted back after the moulding operation. Although this makes possible the best moulding results, it makes very expensive positive moulds necessary. Such movable mould parts are also subject to faults.

SUMMARY OF THE INVENTION

The object of the invention is to specify a process of the generic type which makes possible the cost-effective and reliable production of stud plates with projections from the hollow studs, sufficiently large projections with a sufficiently stable plastic sheet being obtained.

This object is achieved by the using positive moulds, each having an associated mould stud with a moulding side including an upper end face, on which said hollow studs are formed, fixing and holding down a center part of a flexible elastic disc in continuous contact with said upper end face on said moulding side of said associated mould stud, by fixing means, said fixing means being accessible from said moulding side of said mould stud to fix and hold down said center part in a direction opposite to the direction in which said plastic sheet is pulled from said mould stud following vacuum forming, forming said projections(s) by means of said disc, said disc having a flat, lower side and an upper side, said disc being held with a first part of said flat, lower side lying flat and loosely on said upper end face and projecting with a second part of said flat, lower side, contiguous with said first part, beyond a circumferential edge of said upper end face, said disc having a flexural rigidity such that said second part remains extended substantially beyond said circumferential edge of said upper end face when said plastic sheet is drawn over said mould stud, and such that at least said first part bends upwards from said upper end face when said hollow stud is pulled upwards from said mould studs, drawing said plastic sheet over said mould stud by vacuum to form said projection(s), and pulling said hollow stud upwards from said mould stud, said second part sliding along said inner wall of said hollow stud.

The advantage of the invention lies in the fact that the yielding movement, as in the system of movable mould projections, takes place on the mould side, so that the stud plate is not stressed in a manner which runs counter to its actual function. On the other hand, no complicated actuation and control of the mould projections is necessary, since owing to their design and position on the mould studs, these are sufficiently stiff during the moulding operation and on the other hand yield automatically during demoulding.

The preferred embodiments concerning various flexible elastic discs according to the invention result in various shapes of projections.

The preferred embodiments concerning elastic discs subdivided by edge incisions result in a disc shape which facilities the yielding and bending upwards during demoulding.

Preferred adaptations of the subdivided elastic disc are for the purpose of fixing flexible heating tubes.

In another preferred adoption of the elastic discs according to the invention owing to the arrangement of two identical discs, twice the number of mould projections is obtained, if required.

In this case a preferred adaptation to the fixing of flexible heating tubes results.

The further development of using discs of plastic, particularly silicone elastomer, results in a certain resilience of the mould projections at the exposed corners so that the latter, on the one hand, do not bore through the plastic film during moulding and, on the other hand, slide more easily along the inner wall of the hollow stud during demoulding. Even a relatively large stud plate of, for example, 1 m2 can thus be more easily removed from the positive mould.

According to the further development provision is made to form the disc of metal, such as spring bronze, in particular spring steel. This has the advantage that the disc can be thin with sufficient stiffness, so that the overall height can be kept small. The properties of this material are also insensitive to the operating temperatures during vacuum forming. Finally, metal discs are good heat conductors which thus readily take up the heat from the baseplate and the mould studs, which are also made of metal. The plastic sheet is thus held at the correct temperature, even at the critical corner regions of the projections.

The baseplate of the positive mould is first to be conceived as a flat plate, even though the stud plate formed thereon is intended to be laid on a flat floor.

However, it has been found that a slight curvature of the stud plate (with a radius of for example 1 meter) is practically insignificant, since such a stud plat, because of its elasticity, readily adapts to the floor form.

It is therefore provided in a further development to design the baseplate of the positive mould at least as a cylinder barrel section, from which the mould studs stand up aligned radially outwardly. With a plurality of cylinder barrel sections, a multi-cycle mould can be formed in a spatially compact manner. By means of a baseplate extending over the entire cylinder circumference (which can be composed of a plurality of sections) it is also possible to produce "stud plates" in the form of an endless web or of a web of considerably greater length than width.

Thus, for example, on a cylindrical carrier which is mounted so as to be rotatable there can be arranged three baseplates, distributed around the circumference at a distance from one another, in the form of cylinder barrel sections. In a first rotational position, the plastic sheet is drawn onto the first baseplate and moulded. Then the carrier is rotated further through one operating cycle (120°) so that the second baseplate passes into this position for drawing on a plastic sheet whilst the first baseplate assumes the subsequent position in which it is cooled. With the next operating cycle, the third baseplate passes into the position for the drawing of the plastic film, the second baseplate passes into the cooling position and the first baseplate into a demoulding position in which the moulded stud plate is removed from the positive mould. Finally, with a further rotation of the carrier, a new cycle is commenced.

By means of a baseplate extending without interruption around the carrier, with continuous rotation, a stud plate in the form of a long sheet can be moulded.

The invention is explained in greater detail hereinbelow with the aid of the exemplary embodiments shown in the drawing, in which:

BRIEF DESCRIPTION OF THE DRAWINGS

FIG. 8-11 shows various diagrammatically simplified disc shapes, FIG. 12 shows various diagrammatically simplified shapes of the top end face of a mould stud.

DETAILED DESCRIPTION OF PREFERRED EMBODIMENTS

Figure 1:
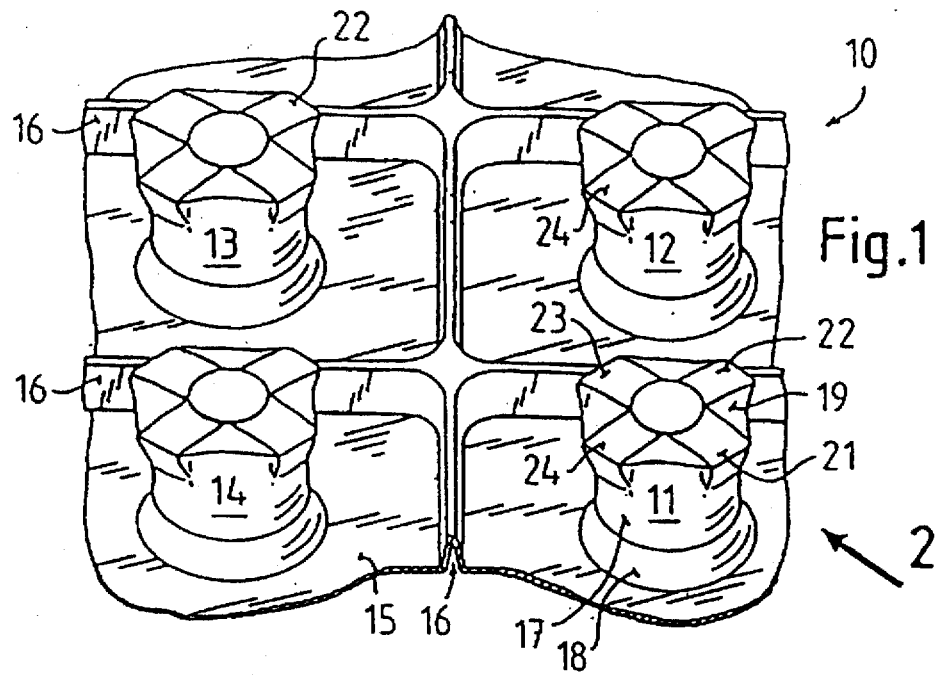
FIG. 1 shows a perspective view of a partial region of a stud plate.

FIG. 1 shows, obliquely from above, a partial region of a stud plate 10 having four hollow studs 11, 12, 13, 14 which are positioned at the corner points of a square, within the scope of manufacturing accuracy are identical to one another and project upwards from a baseplate 15. Between the hollow studs, stiffening webs 16 extending in a cross-shaped manner are moulded in the baseplate 15. This general structure repeats itself regularly over the entire stud plate 10 which is produced in various sizes of, for example, 50×100 cm or 100×100 cm.

As a representative, the hollow stud 11 (FIG. 2) is described in greater detail. It has an approximately circular-cylindrical case 17 which connects at the bottom, via a frustoconical case 18, to the baseplate 15. At the top, the hollow stud 11 has a cover surface 19. Uniformly distributed on the upper edge are four projections 21, 22, 23, 24, by means of which the cover surface 19 obtains roughly an approximately octagonal outline. The projections are arranged such that they are in each case directed towards four hollow studs of the more remote vicinity. The hollow studs 12 and 14 are directly adjacent to the hollow stud 11, whereas the hollow stud 13 can be considered as forming part of the more remote vicinity. Accordingly, for example, the projection 23 faces the hollow stud 13.

Figure 2:
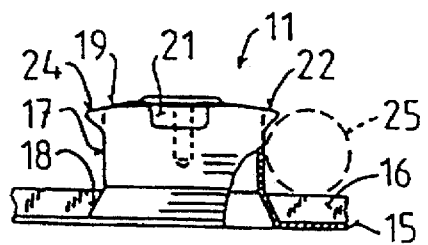
FIG. 2 shows a view in the direction of the arrow 2 of FIG. 1.

With the example of FIG. 2, it can be seen how an indicated flexible tube 25 is fixed. The flexible tube 25 is not drawn in FIG. 1: it must be imagined extending diagonally in the direction of the arrow 2. It lies below on the stiffening webs 16 with its left flank against the circular-cylindrical cases 17 of the hollow studs 11 and 13 an with its right flank against the circular-cylindrical case 17 of the hollow stud 12. Furthermore, the projection 22 of the hollow stud 11 and the projection 22, aligned in the same direction, of the hollow stud 13 engage over the flexible tube 25 from one side. From the other side the projection 24 of the hollow stud 12 (not drawn in FIG. 2) engages over the flexible tube 25 which has an external diameter of approximately 10 mm. Since this clamping repeats itself along the flexible tube 25 in the pattern of the stud plate, the flexible tube 25 is fixed on all sides along its entire course, so that it maintains its position with sufficient stability if the screed is then applied.

Figure 3:
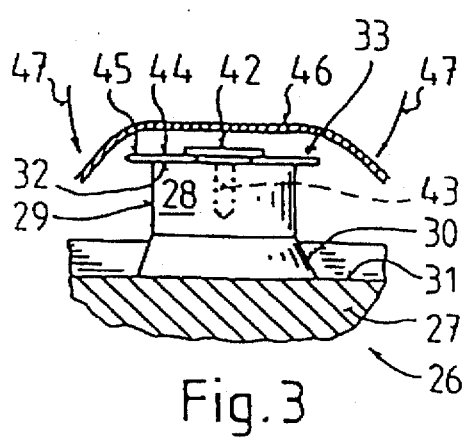
FIG. 3 shows a side view of a partial region of the positive mould before the moulding operation.

FIG. 3 shows a partial region, corresponding to the hollow stud 11, of a positive mould 26. It consists of a stable baseplate 27 from which a plurality of mould studs 28 of the same kind project upwards. Each mould stud 28 has an approximately circular-cylindrical case 29 (a square-prismatic or octagonal-prismatic shape would be equally conceivable, however a circular cylinder is more simple to produce) which is connected at the bottom via a frustoconical case 30 to the flat top side 31 of the baseplate 27. The circular-cylindrical case 29 can advantageously be designed tapering slightly conically towards the top.

Figure 4:
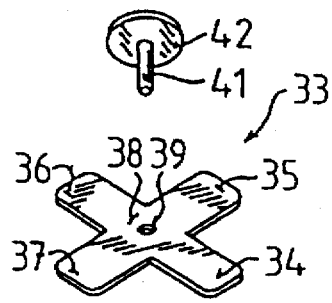
FIG. 4 shows a view of cross-shaped strips with a fastening means.

At the top, the mould stud 28 has a flat end face 32 which is perpendicular to the stud axis and on which a disc 33 lies which is shown in greater detail in FIG. 4. This disc 33 is structured into four strips 34, 35, 36 and 37 which are at right angles to one another and originate radially from a centre part 38 with a central hole 39. A bolt 41 with a moulded-on flat head 42 serves for fastening the disc 33 on the end face 32, in that the bolt 41 crosses the central hole 39 and is driven into an axial hole 43 in the mould stud 28. The head 42 then lies flatly on the centre part 38.

If the end face 32 has a radius of 9 mm, the strips 34-37 are sufficiently long to project approximately 1 to 3 mm, preferably 2 mm, above their circumferential edge. The head 42 has a radius of approximately 5 mm. The strips have a thickness of approximately 0.5 to 1 mm and a width of approximately 5 mm and consist of elastically flexible material, preferably plastic, in particular silicone elastomer which remains sufficiently firm at the moulding temperature, or of elastic metal. The outer corners of the strips are expediently slightly rounded. The disc 33 can be simply punched out from a flat material. It is also possible to produce it with a bolt-like attachment, for example as an injection moulded part, in which case the separate bolt 41 is eliminated.

Figure 5:
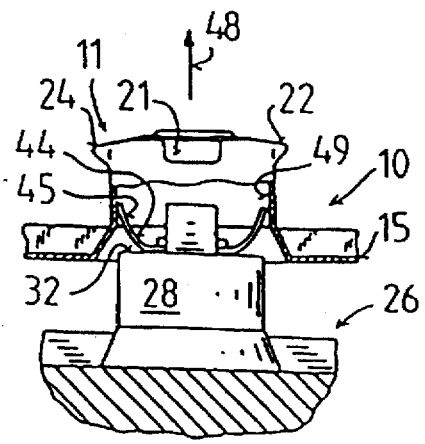
FIG. 5 shows a view corresponding to FIG. 3 during the demoulding operation.

Each strip 34-37 is, in its installed position (FIGS. 3 and 5), structured into three functional parts, the transitions of which can be fluent. A first part 44 corresponds to its flexible length from the edge of the head 42 to the edge of the end face 32, the flexural movement being possible only upwards, away from the end face 32. A second part 45 corresponds to the region projecting over the edge of the end face 32. A third part is identical to the centre part 38 which is firmly clamped under the head 42.

The flexural rigidity of the strips is determined by the suitable choice of material, thickness and width such that the second part 45 bends away only slightly downwards when a preheated plastic sheet 46 to be formed is drawn under the suctional effect of the vacuum over the mould stud 28, as is indicated in FIG. 3 by the arrows 47. The projections 21–24 (FIG. 1) are thereby moulded. If, after the moulding operation, the stud plate 10 resulting from the plastic sheet 46 is removed from the positive mould 26 in the direction of the arrow 48 (FIG. 5), the strips bend upwards at least in the region of their first part 44 from the end face 32, the second part 45 or its edge sliding along bearing slightly against the inner wall 49 of the hollow stud 11, shown as an example here.

Due to the above-described nature of the positive mould 26 and the production process resulting therefrom, some characteristics of the product, the stud plate 10, can be ascertained, as shown in FIG. 1. On the one hand these are the impressions, visible in the cover surface 19 of the strips 34–37 and, if appropriate, of the head 42. The head impression is dispensed with, however, if the stud 41, as already indicated, is integrally moulded on the disc 33. The strip impressions can be hidden somewhat if the free corners on the end face 32 are covered, that is to say if the cross-shaped disc 33 is embedded in a corresponding cross-shaped recess in the end face 32. However, it is not possible to hide a certain non-uniformity of curvature of the cover surface 19 in the region of the projections 21–24 on the multiplicity of hollow studs of a complete stud plate. This is because the spread-out second parts 45 (FIG. 3) of the multiplicity of strips do not behave exactly identically like absolutely stiff mould projections, but yield to different extents. Even differences in stress in the plastic sheet 46, on account of slight temperature differences for example between centre and edge regions, cause a measurably different curvature.

Figure 6:
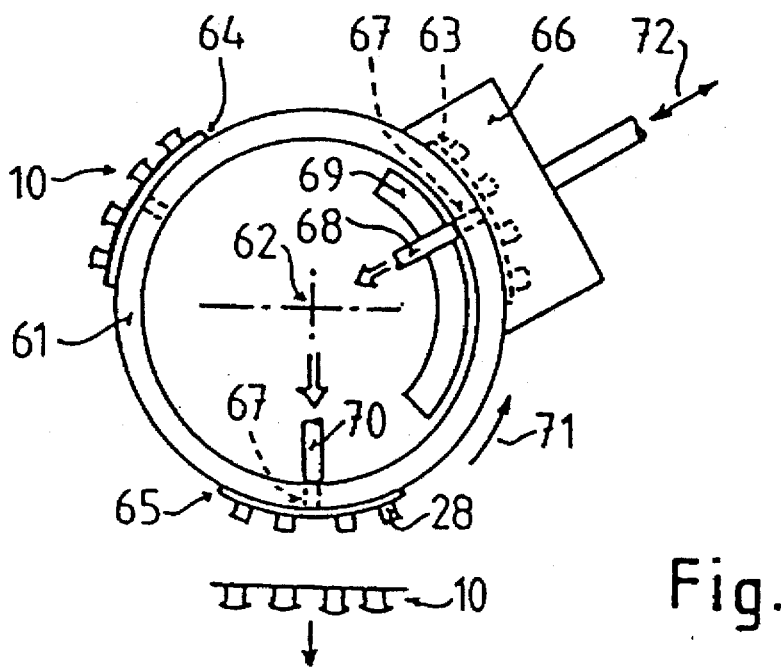
FIG. 6 shows a diagrammatically simplified arrangement of a multi-cycle mould.

According to FIG. 6, a cylindrical carrier 61 with for example a radius of an axial length of in each case 1 meter is mounted in a manner not especially illustrated so as to be rotatable about a stationary shaft 62. On the carrier 61, three identical baseplates 63, 64, 65 in the form of cylinder barrel sections are fastened such that the mould studs 28 attached thereon are directed radially outwards and the baseplates are arranged at positions distributed around the circumference in each case at 120° to one another. In the circumferential direction, each baseplate extends over a length of approximately 1 meter.

The baseplate 63 is in the "moulding position" in which a mould frame 66 is placed thereover in the interior of which a plastic sheet is clamped. The latter is drawn over the mould studs 28 by means of subatmospheric pressure at the baseplate 63 side. To this end, suitable air channels in the baseplate 63 are connected via a channel 67 in the carrier 61 to a stationary suction line 68 which leads to a vacuum pump, not illustrated. Within the carrier 61 there is disposed a stationary heating device 69 by means of which the sector of the carrier 61 with the baseplate 63 is heated.

The baseplate 64 is in the "cooling position". On the baseplate with the mould studs standing up from it there is drawn on the finished moulded stud plat 10 which here has the opportunity to cool off and harden.

The baseplate 65 is in the "demoulding position". Here, via a pressure line 70, air is blown into the air channels via the channel 67 which is also formed here, causing the stud plate 10 to be ejected downwards.

The design and arrangement of the baseplates together with air channels is always the same, so that with each operating cycle with which the carrier 61 is rotated through 120° further in the direction of the arrow 71, a cyclical sequence of operating cycles "moulding—cooling—ejection" is effected at each baseplate. It goes without saying that the mould frame 66 is drawn back in the direction of the arrow 72 before each rotary step, so that before the next moulding operation a new sheet can be inserted.

Figure 7:
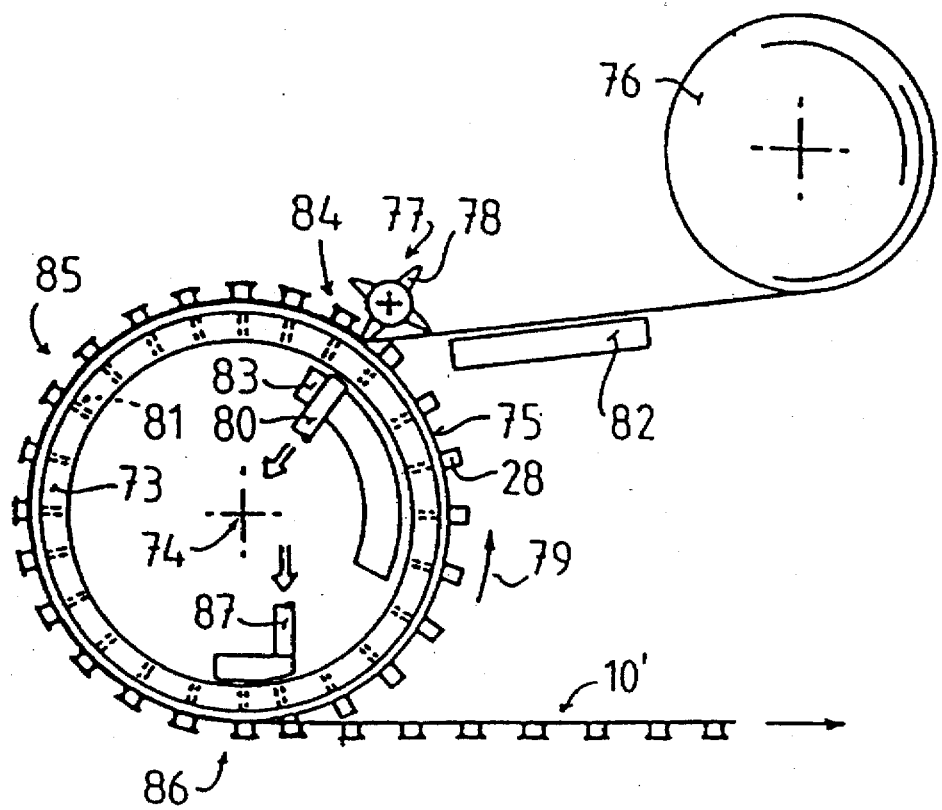
FIG. 7 shows a diagrammatically simplified arrangement of an endless mould.

According to FIG. 7, a cylindrical carrier 73 is mounted so as to be rotatable about a stationary shaft 74. On said carrier 73 there is fastened a baseplate 75 in the form of a complete cylinder barrel, such that the mould studs 28 are directed radially outwards. From the point of view of manufacturing, it is expedient to compose the baseplate 76 from at least two shell parts which, in the assembled state, form functionally a continuous cylinder barrel. From a supply roll 76, a plastic sheet with a width of, for example, 1 meter is fed via a pressing device 77 to the exterior side of the baseplate 75. The pressing device 77 has distributed around its circumference a plurality of strips 78 which, with the rotation of the carrier 73, engage in the direction of the arrow 79 in each case into the gaps between the mould studs 28. They press the still-unmoulded sheet in each case towards the baseplate 75 to such an extent that the air suction which is generated, via a suction line 80 and one of the uniformly distributed channels 81 of the carrier 73, in the region of the pressing device 77 can grasp the plastic sheet. The sheet preheated by a heating device 82 is then drawn by the suction over the mould stud 28. The baseplate 75 with the mould studs 28 is heated by means of a heating device 83 arranged fixed within the carrier 73 in the circumferential sector of this "moulding position" 84. The carrier 73 rotates continuously, so that new regions of plastic sheet are constantly fed and moulded.

Already-moulded sheet can cool off on the subsequent circumferential sector, the "cooling position" 85, in order then to be separated from the mould in the lower circumferential sector, the "demoulding position" 86. To this end, compressed air can be blown, via a stationary pressure line 87, into those channels 81 of the carrier 73 lying opposite there. The ready-moulded stud plate 10, which here is present in the form of a long sheet, can be wound up to form a roll until later use.

FIG. 8 shows discs 90 which, with their second parts 91, project in each case circularly around the entire circumferential edge 92 of the end face of the mould stud.

FIG. 9 shows examples according to which the discs 93 project with their second part 96 in each case over only a partial region of the circumferential edge 92.

According to FIG. 10, the discs 95 project with their second parts 96 over a plurality of partial regions, distributed in the circumferential direction, of the circumferential edge 92.

It is common to the preceding examples that discs 90, 93, 95 have a periphery without incisions. The examples according to FIG. 11, by contrast, show discs 97 which, starting from the circular shape, are structured by approximately radial incision 98. Starting from a common first part 99, there thereby results a plurality of second parts 100 which project over partial regions, in each case distributed in the circumferential direction, of the circumferential edge 92.

A form of the subdivision is shown in FIG. 4, according to which four second parts in the form of strips 34–37 result, the disc 33 taking on the form of a cross-shaped structure. However, as shown in the right-handed diagram of FIG. 11, a strip-shaped disc 101 can also be used which, starting from the common central first part 102, has only two diametrically standingout second parts 103, 104. If, nevertheless, it is still desired to obtain four projections, two such strip-shaped discs 101, 105 can be laid crossed one on top of the other. In principle, such a stacked arrangement can also be carried out in the case of other disc shapes, for example those according to FIG. 9.

FIG. 12 shows, diagrammatically in side view, a mould stud 28 on which any of the above-illustrated discs is fastened. The upper end face 32 can be flat or, like the end face 106, concavely curved. This variant has the advantage that the head 42 of the bold is lower than the mould projections 107 and consequently, those projections of the hollow stud formed thereon represent in each case the highest point of the hollow stud.

I claim:

1. Process for vacuum forming from a plastic sheet a stud plate having hollow studs standing up from a base plate at pre-determined positions, each hollow stud being provided with an inner wall and an upper circumferential edge with at least one radially protruding projection, comprising:

using positive molds (26), each having an associated mold stud (28) with a molding side, including an upper end face (32), on which said hollow studs are formed, fixing and holding down a center part (38) of a flexible elastic disc (33) in continuous contact with said upper face (32) on said molding side of said associated mold stud (28) by fixing means (41, 42), said fixing means being accessible to fix and hold down said center part (38) from said molding side of said mold studs (28), said fixing means fixing and holding down said center part (38) in continuous contact with said upper end face (32) in a direction opposite to the direction in which said plastic sheet (46) is pulled from said mold studs (28) following vacuuming forming, forming said at least one projection by means of said disc (33), said disc (33) having a flat, lower side and an upper side, said disc (33) being held with a first part (44) of said flat, lower side lying flat and loosely on said upper end face (32) and projecting with a second part (45) of said flat, lower side, continuous with said first part (44), beyond a circumferential edge of said upper end face (32), said disc (33) having a flexural rigidity such that said second part (45) remains extended substantially beyond said circumferential edge of said upper end face (32) when said plastic sheet (46) is drawn over said mold studs (28), and such that at least said first part (44) bends upwards from said upper end face (32) when said hollow stud (11) is pulled upwards from said mold studs (28), drawing said plastic sheet (46) over said mold studs (28) by vacuum to form said at least one projection (21, 22, 23, 24) and pulling said hollow stud (11) upwards from said mold stud (28), said second part (45) sliding along said inner wall (49) of said hollow stud (11), wherein said positive mold has at least one base plate (63, 64, 65,75) in the form of at least a section of a cylindrical barrel from which said mold studs (28) project radially outwards towards said molding side of said mold studs.

2. Process according to claim 1, wherein said disc (90) projects with said second part (91) beyond the entirety of said circumferential edge (92) of said upper end face.

3. Process according to claim 1, wherein said disc (93) projects with said second part (94) beyond only a partial region of said circumferential edge (92) of said upper end face.

4. Process according to claim 1, wherein said disc (95) projects with said second part (96) beyond a plurality of partial regions, distributed in the circumferential direction, of said circumferential edge (92) of said upper end face.

5. Process according to claim 1, wherein said disc (97, 101) is sub-divided in the circumferential direction so that a plurality of said second parts (100) are connected to a common first part (99, 102), said second parts (100) projecting beyond partial regions, distributed in the circumferential direction, of said circumferential edge (92) of said upper end face.

6. Process according to claim 5, wherein said disc (97) is sub-divided by edge incisions (98) that extend from the periphery of said disc towards its center.

7. Process according to claim 6, wherein said edge incisions (98) extend to near said center.

8. Process according to claim 5, wherein said plurality of second parts comprises four second parts in the form of strips (34, 35, 36, 37), said disc (33) having a cross-shaped structure that is fixed at said center part (38) in the center of said upper end face (32).

9. Process according to claim 8, wherein said four strips (34, 35, 36, 37) are fastened on said mold stud (28) such that they project beyond said upper end face (32) to face towards four mold studs remote from said associated mold stud (28).

10. Process according to claim 1, wherein at least two of said radially protruding projections are formed by at least two said discs (101, 105) that are held with portions of their first parts (102) lying against one another on said upper end face (32) of said mold stud (28) and project with their second parts (103, 104) beyond different partial regions of said circumferential edge (92) of said upper end face.

11. Process according to claim 10, wherein said at least two said discs are in the form of strips (101, 105) fixed in a cross-shape having said first parts (102) lying one upon the other in the center of said upper end face.

12. Process according to claim 1, wherein said second part (45) of said disc projects approximately 1–3 mm. beyond said circumferential edge of said upper end face (32).

13. Process according to claim 1, wherein said mold stud (28) has an approximately circular cross-section.

14. Process according to claim 1, wherein said upper end face is flat.

15. Process according to claim 1, wherein said upper end face (106) is concave.

16. Process according to claim 1, wherein said disc is comprised of plastic material.

17. Process according to claim 16, wherein said plastic material comprises a silicone elastimer.

18. Process according to claim 1, wherein said disc (33) is comprised of metal.

19. Process according to claim 18, wherein said metal comprises spring steel.

20. Process according to claim 1, wherein said fixing means (41, 42) comprises a head (42) contacting said upper side of said disc (33) and a stem (41) that passes through said disc (33) and is fixed to said mold stud (28).

* * * * *